United States Patent Office 3,017,349
Patented Jan. 16, 1962

3,017,349
DRILLING FLUIDS
Paul W. Fischer, Whittier, Calif., assignor to Union Oil Company of California, Los Angeles, Calif., a corporation of California
No Drawing. Filed Jan. 8, 1954, Ser. No. 403,071
23 Claims. (Cl. 252—8.5)

This invention relates to drilling fluids such as are used in drilling oil and gas wells, and in particular concerns drilling fluids of the oil-base type. It further relates to compositions of matter especially adapted for use in preparing oil-base drilling fluids in the field.

In a number of the oil and gas producing areas of the world the subterranean formations encountered comprise hydratable clays, heaving shale, or other materials which swell in the presence of water to form gel-like bodies having low load-bearing properties. Where formations of this nature occur along the length of the bore the use of aqueous drilling fluids or muds in the drilling operation may bring about collapse of the walls of the bore by reason of such formations becoming hydrated. Also, where the producing formation itself comprises a material of this nature the use of aqueous drilling fluids for completion of the well will cause such material to swell, thereby greatly reducing the permeability of the formation by plugging up the pores and interstices through which the oil or gas flows into the well. In view of these difficulties, in drilling wells by the rotary method in localities where the subterranean formations traversed and/or penetrated by the bore are adversely affected by water, it has become common practice to employ drilling fluids which are substantially non-aqueous, i.e., which contain less than about 10 percent of water. This type of drilling fluid is termed "oil-base" since it characteristically comprises a mineral oil having dispersed therein minor proportions of agents adapted to control and modify the physical properties of the oil.

In general, an oil-base drilling fluid must comprise at least two components in addition to the base oil. The first of these essential components is commonly termed a "plastering" or "wall-building" agent, and is a material which is capable of coating the walls of the bore with an impermeable layer which prevents the escape of the drilling fluid into permeable formations traversed by the bore. Hydratable clays, such as bentonite or its equivalent, and asphalt are commonly employed for this purpose. In some instances the drilling fluid is initially formulated without a wall-building agent but will eventually contain one as a result of clays or clay-like materials being picked up by the fluid during use. The second essential component is a dispersing agent which is capable of maintaining water and solid components of the fluid uniformly dispersed in the base oil. A wide variety of agents have been proposed for use as dispersing agents in oil-base drilling fluids, but for the most part such agents have been metal soaps, e.g., fatty or resin acid soaps of varying degrees of unsaturation, sulfonic and ligno-sulfonic acid soaps, tall oil soaps, etc. For reasons which are not well understood, the nature and identity of the emulsifying and/or dispersing agent has considerable effect on the functioning of the wall-building agent, i.e., the effectiveness of a particular wall-building agent in preventing the loss of fluid into permeable formations traversed by the bore is often largely affected by the type of emulsifying and/or dispersing agent employed. It is for this reason that a large part of the efforts devoted to making improved drilling fluids have been directed towards discovering more efficient dispersing agents. Ideally, such agent should be capable of maintaining solid components of the fluid uniformly dispersed in the liquid phase; it should co-operate with the wall-building agent to secure minimum fluid loss values; it should not unduly increase the viscosity of the composition; it should not interfere with other components of the composition, e.g. gel strength agents, viscosity modifiers, weighting agents; and should be as inexpensive as possible.

I have now found that the above requirements are to a large extent met by a product obtained by reacting an alkaline-earth metal base with a material which is herein referred to as "fatty acid still bottoms." The source of such material is more fully described hereinafter, but it may be defined generally as the material obtained as a bottoms product when vacuum distilling the normally water-insoluble, or fatty acid, portion of the hydrolysate obtained in the continuous high-pressure aqueous hydrolysis of animal and vegetable fats and oils and mixtures thereof. It comprises about 50–70 percent of high-boiling fatty acids having an acid number of about 150–170 mg./g., the remainder being high-boiling unsaponifiable oils, polymers, etc. In particular, I have found that oil-base drilling fluids essentially comprising a liquid suspending agent consisting essentially of mineral oil, a wall-building agent, an alkaline-earth metal base, and a minor proportion of the aforesaid fatty acid distillation bottoms are highly stable over a wide range of temperature and pressure conditions and possess excellent fluid loss characteristics. Such fluids are also stable towards contaminating electrolytes, are capable of being weighted to high apparent densities, and lend themselves to modification through the use of gel strength improvement agents, viscosity modifiers, etc. The alkaline-earth metal base and the fatty acid distillation bottoms may be employed in the form of a previously prepared reaction product or they may be incorporated into the composition as separate ingredients. Also, the wall-building and dispersing agent, together with optional components, may be combined with a part of the oil to form a concentrate composition which can be stored and shipped as such, and eventually diluted at the well site to form the finished drilling fluid.

The mineral oil which constitutes the liquid suspending medium of the drilling fluids provided by the invention may be crude petroleum or a distillate or residuum material. It may also comprise a mixture of oils, such as a blend of a relatively heavy oil, e.g., light tars, cracked residua, heavy extracts and the like, and a light distillate such as gas oil or diesel fuel. Blended oils of this type are usually preferred. In general, however, any of the oils commonly employed in the formulation of oil-base drilling fluids may be employed, and the selection of particular oils on the basis of their chemical and physical characteristics is well understood by those skilled in the art. Usually, such oil will have a gravity between about 12° and about 40° API and a viscosity ranging from about 30 SUS at 100° F. to about 110 SSF at 122° F. The invention, however, is not limited to any particular type of oil or mixtures thereof. In addition to the mineral oil, the liquid suspending agent may also comprise water which may be intentionally introduced into the composition or which may be acquired incidentally during use.

The wall-building component may be any of the wall-building or plastering agents commonly employed in formulating oil-base drilling fluids, e.g., natural or synthetic asphaltic bitumen, gilsonite, blown or polymerized asphalt, clays, carboxymethylcellulose and other cellulose derivatives, wood and bark fibers, etc. High quality hydratable clays, such as bentonite, montmorillonite or or kaolinite, are preferred by reason of their general availability and effectiveness. Also, the wall-building agent may be one acquired by the composition during use.

As previously stated the dispersing agent is the reaction product of an alkaline-earth metal base and the aforesaid fatty acid distillation bottoms. Such product may be pre-prepared by reacting the distillation bottoms with 10–60 percent by weight of the base, or more preferably, it may be formed in situ simply by incorporating the distillation bottoms and the base into the composition. The alkaline-earth metal base may be calcium oxide or hydroxide, magnesium oxide, barium hydroxide, calcium acetate, etc. Calcium oxide and hydroxide, particularly the former, are preferred.

The product which is herein referred to as fatty acid distillation bottoms is obtained as a by-product from the continuous process for hydrolyzing animal and vegetable fats and oils. According to the conventional manner of carrying out such process, the feed material is pre-heated and is introduced under pressure into the lower portion of a vertical autoclave. Water is similarly preheated and introduced under pressure into the upper portion of the autoclave. The autoclave is maintained at a temperature of at least about 350° F., usually between about 365° F. and about 600° F., and at a pressure sufficient to maintain the water in the liquid state, usually between about 150 and about 1600 p.s.i. Within the autoclave, the fatty material rises upwardly through the descending body of water, and is hydrolyzed to form free fatty acids and glycerine. The latter dissolves in the water and is continuously withdrawn from the bottom of the autoclave in the form of a 15–25 percent aqueous solution known as "sweet water." Crude free fatty acids are continuously withdrawn from the top of the autoclave and are passed to a flash drum where the pressure is relieved, thereby causing the water which is dissolved in the fatty acids at the elevated reaction temperatures and pressures to separate and to flash off as steam. The crude acids are then passed to a flash distillation unit operated under a vacuum of about 5–25 mm. or lower and at a temperature of at least about 220° F. The overhead fraction constitutes relatively pure fatty acids, whereas the undistilled bottoms fraction constitutes the fatty acid distillation bottoms product which is employed to prepare the drilling fluids of the present invention. This product is a black molasses-like material which becomes relatively fluid upon moderate heating. Usually it boils above about 325° F. at 0.5 mm., corresponding to about 700° F. at atmospheric pressure. In addition to high-boiling fatty acids and non-saponifiable oils and/or polymers it may contain a small quantity, e.g., 2–5 percent, or a metal soap as a result of the same or the corresponding oxide, e.g., zinc, calcium or magnesium oxide, having been employed to catalyze the hydrolysis reaction.

The proportions in which the foregoing essential components are employed may be varied between relatively wide limits. The wall-building agent is provided in minor proportion, usually between about 0.1 and about 10 percent by weight of the entire composition, although as previously stated the initial formulation may omit such agent if the fluid is to be used in localities where it will acquire a natural wall-building agent during use. Water is usually intentionally employed in an amount representing between about 2 and about 10 percent by weight of the entire composition, although the fluid may eventually contain as high as 30 or even 40 percent of water as a result of contamination during use. The dispersing agent is likewise provided in minor proportion, sufficient to maintain the wall-building agent and any other solid components stably dispersed in the liquid phase. Usually such amount represents between about 1 and about 10 percent by weight of the entire composition. When the dispersing agent is prepared in situ by dispersing the components thereof in the liquid phase, the fatty acid distillation bottoms product is employed in an amount representing between about 0.5 and about 9 percent by weight of the entire composition and the alkaline-earth metal base is employed in an amount at least substantially equivalent to the amount chemically equivalent to the free fatty acids present in the distillation bottoms product. If desired, a considerable excess of the base may be employed. Usually between about 5 and about 75 parts of alkaline-earth metal base are employed per 100 parts of the distillation bottoms.

While no particular order of mixing need be observed in combining the essential components of the new compositions, it is usually most convenient to form an initial concentrate composition comprising the fatty acid distillation bottoms product, the wall-building agent, and part of the liquid suspending medium. When it is desired to form the finished fluid such concentrate can be diluted with the remainder of the oil and the alkaline-earth metal base thereafter added. Thus, 100 parts of fatty acid distillation bottoms may be combined with 5–25 parts of the wall-building agent, 10–200 parts of oil and 5–25 parts of water to obtain a concentrate composition which can subsequently be diluted with oil, and combined with 20–35 parts of calcium oxide to form a finished drilling fluid. A small proportion of an alkali-metal alkali, e.g. 2–25 parts of sodium or potassium hydroxide, etc. per 100 parts of the fatty acid distillation bottoms, may be advantageously incorporated in the concentrate composition to promote homogeneity. Alternatively, the pre-prepared dispersing agent may be admixed with the wall-building agent and part of the oil and water to obtain an equivalent composition. If desired, however, the finished composition may be prepared directly by admixing the dispersing agent, or its components and the wall-building agent in the desired quantity of the liquid suspending medium. The following examples will illustrate several ways in which the principle of the invention has been applied, but are not to be construed as limiting the same.

*Example I*

The following concentrate composition was prepared:

Fatty acid distillation bottoms _____gms__ 100
Wyoming bentonite _____gms__ 15
Water _____gms__ 15
Light distillate oil (diesel fuel) _____ml__ 15

The resulting composition was then stirred into 1500 ml. of domestic fuel oil (API gravity=15°), after which there was added a suspension of 27 gms. of calcium oxide in 300 ml. of the light distillate oil. The resulting composition had a Marsh viscosity at 115° F. of 135, and a fluid loss value (API Code 29) of 4 ml./hr. A similar oil-base fluid containing 60 gms. of water and 200 gms. of fatty acid distillation bottoms had a Marsh viscosity of 116, and a fluid loss value of 4 ml./hr.

*Example II*

Seven concentrate compositions were prepared as in Example I except that the water content was increased to 60 ml. and 5 gms. of sodium hydroxide were added. Each composition was diluted with 1500 ml. of the domestic fuel oil, and was then admixed with 300 ml. of diesel fuel having suspended therein varying amounts of calcium oxide. The correlation between the amount of calcium oxide and the physical properties of the finished fluids was as follows:

| CaO Employed, gms. | Marsh Viscosity, Secs., at 115° F. | Fluid Loss, ml./hr. at 200° |
|---|---|---|
| 5 | 124 | 7 |
| 15 | 110 | 5 |
| 25 | 125 | 2 |
| 35 | 111 | 2 |
| 45 | 132 | 2 |
| 55 | 115 | 1 |
| 65 | 137 | 1 |

In the foregoing example, the sodium hydroxide served to maintain the concentrate homogeneous and, in the finished fluid, as a gel strength improvement agent. Alkali-metal alkalies, e.g., sodium hydroxide, potassium hydroxide, sodium carbonate, etc., may be used generally to impart improved gel strength properties to the drilling fluids of the invention, and are usually employed in an amount representing between about 0.05 and about 2.5 percent by weight of the entire composition.

*Example III*

A concentrate composition was prepared as in Example I, except that 60 ml. of water were employed. The concentrate was then stirred into 1500 ml. of the domestic fuel, followed by 45 gms. of calcium oxide suspended in 300 ml. of the diesel fuel. The resulting composition was then stored at 180° F. At various intervals, samples were withdrawn and the physical properties thereof were determined as follows:

| Storage Time, Hrs. | Marsh Viscosity, Secs., at 115° | Fluid Loss, ml./hr., at 200° |
| --- | --- | --- |
| 96 | 124 | 0 |
| 120 | 120 | 2 |
| 144 | 129 | 2 |
| 168 | 130 | 2 |

These data demonstrate the excellent high-temperature stability of the present type of drilling fluid.

While the drilling fluids provided by the invention essentially consist only of the base oil, the wall-building agent, the dispersing agent, and water, they may also comprise various optional components adapted to modify one or more properties of the fluid. The use of alkali-metal alkalies as gel strength improvement agents is illustrated in Example II, above. Alkali-metal silicates, e.g., sodium silicate, may be similarly employed. Finely-divided inorganic solids of high density, e.g., barytes, whiting, iron oxide, calcined clay, calcium carbonate, lead dust etc., may be employed as weighting agents to increase the apparent density of the fluid. Glycols may be employed to reduce the viscosity of the concentrate composition, and auxiliary emulsifying and/or dispersing agents may be employed in conjunction with the fatty acid distillation bottoms reaction product. Also, small amounts of heavy metal salts, e.g. salts of zinc, iron, manganese, nickel, etc., may be employed to promote the reaction between the alkaline-earth metal base and the fatty acid distillation bottoms product.

*Example IV*

| | Parts by wt. |
| --- | --- |
| Light diesel fuel | 950 |
| Water | 50 |
| Blown asphalt | 10 |
| Fatty acid distillation bottoms | 45 |
| Calcium hydroxide | 10 |
| Sodium silicate, 40% | 25 |

*Example V*

| | |
| --- | --- |
| Light diesel fuel | 200 |
| Domestic fuel oil | 1000 |
| Reaction product of fatty acid: Distillation bottoms and barium hydroxide | 135 |
| Montmorillonite | 50 |
| Barytes | 150 |

*Example VI*

| | |
| --- | --- |
| Domestic fuel oil | 900 |
| Water | 50 |
| Asphalt | 50 |
| Fatty acid distillation bottoms | 60 |
| Sodium resinate | 20 |
| Calcium hydroxide | 60 |

Other modes of applying the principle of my invention may be employed instead of those explained, change being made as regards the methods or materials employed, provided the steps or compositions stated by any of the following claims, or the equivalent of such stated steps or compositions, be employed or obtained.

I, therefore, particularly point out and distinctly claim as my invention:

1. An oil-base drilling fluid essentially comprising a mineral oil-containing liquid suspending medium, a wall-building agent and the reaction product of an alkaline-earth metal base with the undistilled bottoms fraction obtained by vacuum distilling off under vacuum of about 5 to 25 mm. at a temperature of at least about 220° F. the fatty acid portion of the product obtained by reacting water with a material selected from the class consisting of animal and vegetable fats and oils and mixtures thereof at elevated temperatures of about 350° F. to about 600° F. and pressures between about 150 and 1600 p.s.i. to maintain the water in liquid state, said reaction product being employed in an amount sufficient to maintain said wall-building agent dispersed in said liquid suspending medium but insufficient to increase the viscosity of said suspending medium to such an extent that the said drilling fluid cannot be circulated in a well bore.

2. A composition according to claim 1 wherein said wall-building agent is an hydratable clay.

3. A composition according to claim 1 wherein the alkaline-earth metal base is selected from the class consisting of calcium oxide and calcium hydroxide.

4. A composition according to claim 1 wherein the reaction product is employed in an amount representing between about 1 and about 10 percent by weight of the entire composition.

5. A composition according to claim 1 containing a minor proportion of an alkali-metal alkali.

6. An oil-base drilling fluid comprising a mineral oil having dispersed therein between about 2 and about 10 percent by weight of water, between about 0.1 and about 10 percent by weight of an hydratable clay, and an amount between about 1 and about 10 percent by weight, but insufficient to increase the viscosity of the mineral oil to such an extent that said drilling fluid cannot be circulated in a well bore, of the product of reaction between an alkaline-earth metal base and the undistilled bottoms fraction obtained by vacuum distilling off under vacuum of about 5 to 25 mm. at a temperature of at least about 220° F. the fatty acid portion of the product obtained by reacting water with a material selected from the class consisting of animal and vegetable fats and oils and mixtures thereof at elevated temperatures of about 350° F. to about 600° F. and pressures between about 150 and 1600 p.s.i. to maintain the water in liquid state.

7. A composition according to claim 6 wherein the alkaline-earth metal base is selected from the class consisting of calcium oxide and calcium hydroxide.

8. A composition according to claim 6 wherein said bottoms fraction contains between about 50 and about 70 percent by weight of fatty acids having an acid number between about 150 and about 170.

9. A composition according to claim 6 containing between about 0.05 and about 2.5 percent by weight of an alkali-metal alkali.

10. A composition according to claim 8 wherein the alkaline-earth metal base is calcium oxide.

11. A composition according to claim 9 wherein the alkaline-earth metal base is calcium oxide.

12. A composition of matter adapted to be treated with an alkaline-earth metal base and diluted with an oil-containing liquid suspending medium to form an oil-base drilling fluid, comprising about 100 parts by weight of the undistilled bottoms fraction obtained by vacuum distilling off under vacuum of about 5 to 25 mm. at a temperature of at least about 220° F. the fatty acid portion of the product obtained by reacting water with a material selected from the class consisting of animal and vegetable fats and oils and mixtures thereof at elevated temperatures of about 350° F. to about 600° F. and pressures between about 150 and 1600 p.s.i. to maintain the water in liquid state, between about 5 and about 25 parts by weight of an hydratable clay, between about 5 and about 25 parts by weight of water, between about 2 and about 25 parts by weight of an alkali-metal alkali, and between about 10 and about 200 parts by weight of mineral oil.

13. A composition according to claim 12 wherein said bottoms fraction contains between about 50 and about 70 percent by weight of fatty acids having an acid number between about 150 and about 170.

14. A composition according to claim 13 wherein the alkali-metal alkali is sodium hydroxide.

15. The method of making a drilling fluid which comprises dispersing in a mineral oil-containing liquid suspending medium a drilling fluid wall-building agent and the undistilled bottoms fraction obtained by vacuum distilling off under vacuum of about 5 to 25 mm. at a temperature of at least about 220° F. the fatty acid portion of the product obtained by reacting water with a material selected from the class consisting of animal and vegetable fats and oils and mixtures thereof at elevated temperatures of about 350° F. to about 600° F. and pressures between about 150 and 1600 p.s.i. to maintain the water in liquid state, and thereafter adding an alkaline-earth metal base, said bottoms fraction and alkaline-earth metal base being employed in an amount sufficient to maintain said wall-building agent dispersed in said suspending medium but insufficient to increase the viscosity of said suspending medium to such an extent that the said drilling fluid cannot be circulated in a well bore.

16. The method of making a drilling fluid which comprises dispersing in mineral oil beteenn about 0.1 and about 10 percent by weight of an hydratable clay, between about 2 and about 10 percent by weight of water, an amount between about 0.5 and about 9 percent by weight, but insufficient to increase the viscosity of said mineral oil to such an extent that the said drilling fluid cannot be circulated in a well bore, of the undistilled bottoms fraction obtained by vacuum distilling off under vacuum of about 5 to 25 mm. at a temperature of at least about 220° F. the fatty acid portion of the product obtained by reacting water with a material selected from the class consisting of animal and vegetable fats and oils and mixtures thereof at elevated temperatures of about 350° F. to about 600° F. and pressures between about 150 and 1600 p.s.i. to maintain the water in liquid state, and an amount of an alkaline-earth metal base at least substantially chemically equivalent to the fatty acids contained in said bottoms fraction.

17. The method of claim 16 wherein the alkaline-earth metal base is selected from the class consisting of calcium oxide and calcium hydroxide and is employed in an amount representing between about 5 and about 75 parts per 100 parts by weight of said bottoms fraction.

18. The method of claim 16 wherein said bottoms fraction contains between about 50 and about 70 percent by weight of fatty acids having an acid number between about 150 and about 170.

19. The method of claim 18 wherein the alkaline-earth metal base is calcium oxide.

20. An oil-base drilling fluid containing (1) an amount between about 0.5 and about 9 percent by weight, but insufficient to increase the viscosity of said fluid to such an extent that it cannot be circulated in a well bore, of the undistilled bottoms fraction obtained by vacuum distilling at a pressure of about 5–25 mm. and a temperature above about 220° F., the water-insoluble portion of the product obtained by reacting water with a material selected from the class consisting of animal and vegetable fats and oils and mixtures thereof at a temperature of at least about 350° F. to about 600° F. and a pressure between about 150 to 1600 p.s.i. sufficient to maintain the water in the liquid state, said bottoms fraction containing between about 50 and about 70 percent by weight of fatty acids having an acid number between about 150 and 170, and (2) between about 5 and about 75 parts of calcium oxide per 100 parts of said bottoms fraction.

21. In a process for drilling a well wherein a drilling fluid comprising a mineral oil dispersion of a wall-building agent is circulated in the well bore, the method of forming an improved seal on the wall of said bore which comprises admixing with said fluid the reaction product of an alkaline-earth metal base with the undistilled bottoms fraction obtained by vacuum distilling off under vacuum of about 5 to 25 mm. at a temperature of at least about 220° F. the fatty acid portion of the product obtained by reacting water with a material selected from the class consisting of animal and vegetable fats and oils and mixtures thereof at elevated temperatures of about 350° F. to about 600° F. and pressures between about 150 and 1600 p.s.i. to maintain the water in liquid state, said reaction product being employed in an amount sufficient to maintain said wall-building agent dispersed in said mineral oil and to reduce the fluid loss due to filtration through said seal without increasing the viscosity of said fluid to such an extent that it cannot be circulated in the well bore, and contacting the walls of said bore with the resulting fluid to form said seal thereon.

22. In a process for drilling a well wherein a drilling fluid comprising a mineral oil dispersion of a wall-building agent is circulated in the well bore, the method of forming an improved seal on the wall of said bore which comprises admixing with said fluid an alkaline-earth metal base and the undistilled bottoms fraction obtained by vacuum distilling off under vacuum of about 5 to 25 mm. at a temperature of at least about 220° F. the fatty acid portion of the product obtained by reacting water with a material selected from the class consisting of animal and vegetable fats and oils and mixtures thereof at elevated temperatures of about 350° F. to about 600° F. and pressures between about 150 and 1600 p.s.i. to maintain the water in liquid state, said alkaline-earth metal base and said bottoms fraction being employed in amounts sufficient to maintain said wall-building agent dispersed in said mineral oil and to reduce the fluid loss due to filtration through said seal without increasing the viscosity of said fluid to such an extent that it cannot be circulated in the well bore, and contacting the walls of said bore with the resulting fluid to form said seal thereon.

23. The process of claim 22 wherein the said bottoms fraction contains between about 50 and about 70 percent by weight of fatty acids having an acid number between about 150 and about 170, and said alkaline-earth metal base is selected from the class consisting of calcium oxide and calcium hydroxide.

References Cited in the file of this patent

UNITED STATES PATENTS

| | | |
|---|---|---|
| 2,099,825 | Rolshausen et al. | Nov. 23, 1937 |
| 2,341,134 | Adams et al. | Feb. 8, 1944 |
| 2,599,752 | Fischer | June 10, 1952 |
| 2,623,015 | Fischer | Dec. 23, 1952 |
| 2,675,352 | Dawson | Apr. 13, 1954 |
| 2,702,787 | Freeland | Feb. 22, 1955 |